Figures 1, 4:
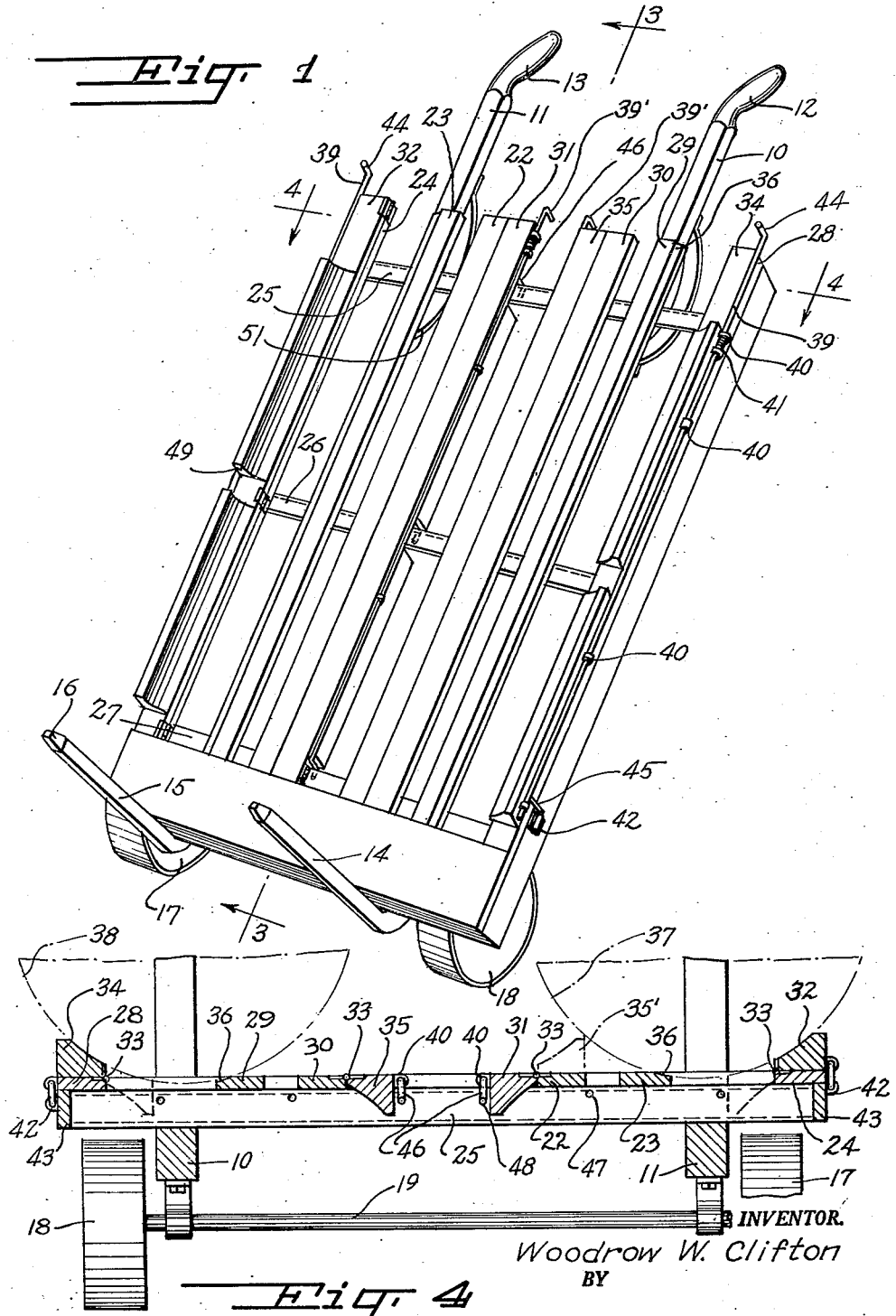

Nov. 5, 1957  W. W. CLIFTON  2,812,190
HAND TRUCK WITH CONVERTIBLE PLATFORM
Filed Feb. 1, 1955  2 Sheets-Sheet 1

INVENTOR.
Woodrow W. Clifton
BY
McMorrow, Berman & Davidson
ATTORNEYS

Nov. 5, 1957 W. W. CLIFTON 2,812,190
HAND TRUCK WITH CONVERTIBLE PLATFORM
Filed Feb. 1, 1955 2 Sheets-Sheet 2
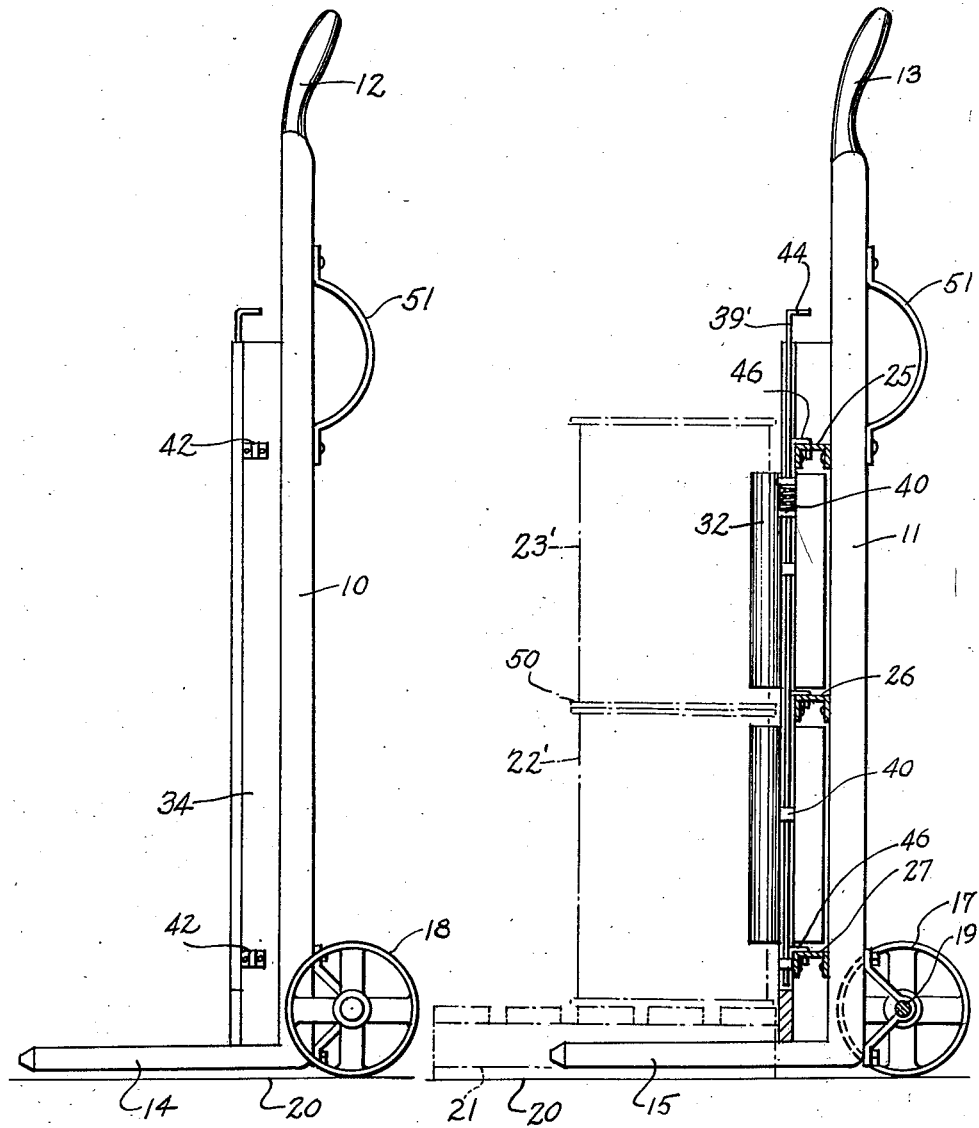
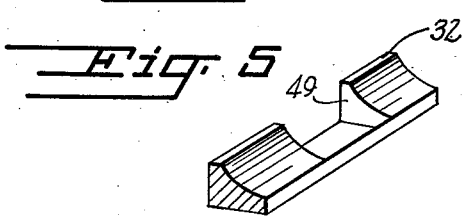
INVENTOR.
Woodrow W. Clifton
BY
McMorrow, Berman + Davidson

United States Patent Office 2,812,190
Patented Nov. 5, 1957

2,812,190

HAND TRUCK WITH CONVERTIBLE PLATFORM

Woodrow W. Clifton, St. Augustine, Fla.

Application February 1, 1955, Serial No. 485,363

2 Claims. (Cl. 280—47.18)

The present invention relates to hand trucks of the type for moving loaded pallets.

The primary object of the present invention is to provide a hand truck having means freely insertable beneath a loaded pallet on a pallet supporting surface for raising the pallet with its load into a position supporting the load on the hand truck.

Another object of the present invention is to provide a hand truck having means for lifting a pallet loaded with cylinders and providing means for holding the cylinders on the truck.

A further object of the present invention is to provide a hand truck having means for lifting a pallet loaded with cylindrical containers in stacked side by side relation and providing means for holding the stacked containers on the truck.

A still further object of the present invention is to provide a hand truck having means selectively shiftable from a flat package supporting position to a cylindrical container supporting and holding position.

These and other objects and advantages of the present invention will be fully apparent from the following description when taken in connection with the annexed drawings, in which:

Figure 1 is a view in perspective of the hand truck of the present invention,

Figure 2 is a side view of the hand truck of the present invention disposed in a vertical position, Figure 3 is a side view partially in cross-section on line 3—3 of Figure 1, showing the chocks of the present invention in their upright position, Figure 4 is an end view partially in cross-section on line 4—4 of Figure 1, and Figure 5 is an isometric view of a portion of one of the chocks of the present invention.

Referring in greater detail to the drawings in which like numerals indicate like parts throughout the several views, the present invention provides a hand truck consisting of the following components:

A pair of vertically disposed members 10 and 11 are arranged in longitudinal spaced relation and are provided with handles 12 and 13 on the upper end of each of said members, respectively.

A pair of prongs 14 and 15 project perpendicularly from the lower ends of the members 10 and 11, respectively, and extend in the same direction parallel to each other Each prong 14 and 15 is provided at its free end with a blunt point, as indicated by the reference numeral 16.

A pair of wheels 18 and 17 are arranged adjacent to each of the members 10 and 11, respectively, and rollably support each of the lower ends of the members 10 and 11. The wheels 17 and 18 rotate about an axis transverse of the members 10 and 11, respectively, the axes of the wheels being positioned with respect to the said prongs 14 and 15 so as to enable the wheels 17 and 18 when members 10 and 11 are in their vertical position to support the prongs 14 and 15 above a wheel supporting surface 20 which supports a pallet 21, as shown in Figure 3, a distance to permit the free insertion of the prongs 14 and 15 beneath the pallet when supported on such surface.

As shown in the drawings, the wheels 17 and 18 have a common axis or axle 19 disposed transversely with respect to the members 10 and 11, one wheel being positioned exteriorly of the member 10 and the other wheel being positioned exteriorly of the member 11.

A pallet 21 is shown in Figure 3 in dotted lines and is seen to support a pair of stacked cylindrical containers 22' and 23', also shown in dotted lines.

A platform is provided by the present invention and is superimposed and carried by the members intermediate the ends of the members 10 and 11 and includes longitudinally arranged spaced slats 22, 23, and 24, which are fixedly secured to the cross members 25, 26 and a lower cross member 27 in a single group of slats.

A second group of slats consists of the fixed slats 28, 29 and 30.

Slats 31 and 32 are positioned adjacent to and flush with respect to the fixed slats 22 and 24 respectively of the first group of slats and are hingedly connected by means of hinges 33 to the fixed slats 22 and 24 respectively, for movement from the flush positions to positions overlying the fixed slats 22 and 24 respectively. Slats 34 and 35 are also positioned adjacent to and flush with respect to the fixed slats 28 and 30 respectively of the second group of slats and are hingedly connected by means of hinges 33 to the fixed slats 28 and 30 respectively, for movement from the flush positions to positions overlying the fixed slats 28 and 30 respectively.

One side edge 36 of each of the slats 23 and 29 is chamfered in order to accommodate the external surface of a cylindrical container indicated by the dotted lines in Figure 4 by the reference numerals 37 and 38 respectively. Each of the slats 31 and 32 of the first group and 34 and 35 of the second group have one side conformably shaped to fit the external surface of the cylindrical containers 37 and 38 respectively, when in the overlying positions.

Means is provided for latching the slats 31 and 32, and 34 and 35, in either the upright position or in the retracted or superimposed position with respect to the members 10 and 11.

The latch means of the present invention includes a longitudinally arranged rod 39 slidably connected to the side of each of the slats 31 and 32, 34, and 35. A plurality of spaced eye-formations 40 secured to each of the slats 31, 32 and 34 and 35 supports its associated rod 39 for longitudinal movement therethrough, springs 41 biasing the rods 39 to their downward positions. Other eye-formations 42 are secured to the side rails 43, one of the latter being on each side of the platform thus formed adjacent the wheels 17 and 18. Each of the rods 39 is formed on its upper end with a handle 44 by means of which it is manipulated to insert its outwardly bent arm 45 within the respective one of the eye-formations 42 to latch the slats 32 and 34 in the upright container engaging position.

Other arms 46 are associated with the rods 39' on each of the slats 31 and 35 and are seatable within the holes 47 in the cross members 25 and 27 when in the upright position, as shown in the dotted lines in Figure 4, or in holes 48 in the cross member 25 when in the collapsed or nested position. The dotted line position of the slat 35 is indicated by the reference numeral 35' in Figure 4.

It is to be understood that the curved one face of each of the slats of each group is to be conformably shaped to the cylindrical container most often used in the particular industry where the hand truck of the present invention is employed. Further, the positioning of the slats 31, 32 and 34 and 35 on the platform may be adjusted to accommodate fewer or more cylindrical containers in side by side abutting relation with respect to each other. The curved and upstanding portion of each of the slats 31, 32 and 34 and 35, forming the chocks, is not continuous for the full length of the slat, as shown in Figures 3 and 4 but is provided with a cut away section indicated in Figure 5 by the reference numeral 49, the slat 32 being here illustrated.

The cut away portion of each of the slats 31, 32 and 34 and 35 in each group permits the selective stacking of cylindrical containers or packages having rims as indicated by the reference numeral 50 in Figure 3. Bands 51 adjacent each handle 12 and 13 support the handles off the floor or ground.

What is claimed is:

1. In a hand truck, a pair of vertically disposed members arranged in longitudinal spaced relation, a handle on the upper end of each of said members, a prong projecting perpendicularly from the lower end of each of said members, said prongs extending in the same direction and being parallel to each other, a wheel rollably supporting each of the lower ends of said members, each of said wheels being rotatable about an axis transverse of the adjacent member, said wheel axes being positioned with respect to said prongs so as to enable said wheels when the members are in their vertical position to support the prongs above a wheel supporting surface which supports a pallet a distance sufficient to permit the free insertion of said prongs beneath a pallet when supported on such surface, and a platform mounted upon the forward sides of and operatively connected to said members intermediate the ends thereof, said platform including a plurality of slats positioned in longitudinal flush relation with respect to each other, certain of said slats being fixed and other of said slats being shiftable from the flush positions to positions overlying the fixed slats to form chocks for holding a cylindrical container therebetween when supported on said platform.

2. In a hand truck, a pair of vertically disposed members arranged in longitudinal spaced relation, a handle on the upper end of each of said members, a prong projecting perpendicularly from the lower end of each of said members, said prongs extending in the same direction and being parallel to each other, a wheel rollably supporting each of the lower ends of said members, each of said wheels being rotatable about an axis transverse of the adjacent member, said wheel axes being positioned with respect to said prongs so as to enable said wheels when the members are in their vertical position to support the prongs above a wheel supporting surface which supports a pallet a distance sufficient to permit the free insertion of said prongs beneath a pallet when supported on such surface, and a platform mounted upon the forward sides of and operatively connected to said members intermediate the ends thereof, said platform including a plurality of slats positioned in longitudinal flush relation with respect to each other, certain of said slats being fixed and others of said slats being shiftable from the flush positions to positions overlying the fixed slats to form chocks for holding a cylindrical container therebetween when supported on said platform, each of said shiftable slats being conformably shaped to fit when in the overlying positions with the external surface of a cylindrical container supported upon said platform.

References Cited in the file of this patent

UNITED STATES PATENTS

| | | |
|---|---|---|
| D. 143,420 | Gaines | Jan. 1, 1946 |
| 530,991 | Grieb | Dec. 18, 1894 |
| 547,617 | Pratt | Oct. 8, 1895 |
| 1,114,853 | Brown et al. | Oct. 27, 1914 |
| 1,460,266 | Monroe | June 26, 1923 |
| 2,543,254 | Osborn | Feb. 27, 1951 |